(12) United States Patent
Wilder et al.

(10) Patent No.: US 9,034,192 B2
(45) Date of Patent: May 19, 2015

(54) LIQUID FILTER DEVICE

(75) Inventors: Haim Wilder, Raanana (IL); Rami Ronen, Ramat HaSharon (IL); Eyal Krystal, Kfar Saba (IL); Shlomo Hillel, Modiin (IL)

(73) Assignee: STRAUSS WATER LTD., Petach Tikva (IL)

( * ) Notice: Subject to any disclaimer, the term of this patent is extended or adjusted under 35 U.S.C. 154(b) by 542 days.

(21) Appl. No.: 13/394,682

(22) PCT Filed: Sep. 7, 2010

(86) PCT No.: PCT/IL2010/000741
§ 371 (c)(1),
(2), (4) Date: Mar. 7, 2012

(87) PCT Pub. No.: WO2011/030340
PCT Pub. Date: Mar. 17, 2011

(65) Prior Publication Data
US 2012/0168357 A1    Jul. 5, 2012

Related U.S. Application Data

(60) Provisional application No. 61/240,707, filed on Sep. 9, 2009.

(51) Int. Cl.
*B01D 24/10* (2006.01)
*B01D 24/08* (2006.01)
(Continued)

(52) U.S. Cl.
CPC ............ *C02F 1/003* (2013.01); *B01D 35/147* (2013.01); *B01D 24/18* (2013.01); *B01D 24/007* (2013.01); *B01D 2201/325* (2013.01); *B01D 35/143* (2013.01); *B01D 2201/32* (2013.01);
(Continued)

(58) Field of Classification Search
CPC .... B01D 27/10; B01D 35/143; B01D 35/147; B01D 35/30; B01D 2201/67; B01D 2201/32; B01D 2201/325; B01D 24/007; B01D 24/008; B01D 24/18; B01D 29/58; C02F 1/003; C02F 1/006; C02F 2201/003; C02F 2201/005; C02F 2301/024; C02F 2301/04; C02F 2201/16; C02F 2303/14; B67D 7/30; B67D 7/301; B67D 7/32; B67D 7/76
USPC ............ 210/85–87, 100, 138, 337, 338, 456, 210/264, 266, 284; 222/14, 21, 22, 189.06, 222/189.08
See application file for complete search history.

(56) References Cited

U.S. PATENT DOCUMENTS 789,968 A    5/1905 Ernst
1,090,283 A    3/1914 Crandall
(Continued)

FOREIGN PATENT DOCUMENTS

CN    1143331 A    2/1997
CN    1541744 A    11/2004
(Continued)

*Primary Examiner* — Joseph Drodge
(74) *Attorney, Agent, or Firm* — Browdy and Neimark, PLLC

(57) ABSTRACT

Provided is a filter device for filtering liquid by passing it through one or more filtering media. The filter device comprises a cartridge defining a treatment region filled with said one or more filtering media and has a liquid inlet and a liquid outlet. A locking mechanism may be located within a liquid flow through the cartridge and configured to lock at least one of the liquid inlet and the liquid outlet upon expiration of life time of said at least one filtering medium.

21 Claims, 9 Drawing Sheets

(51) Int. Cl.
*C02F 1/00* (2006.01)
*B67D 7/30* (2010.01)
*B01D 35/143* (2006.01)
*B01D 35/147* (2006.01)
*B01D 24/18* (2006.01)
*B01D 24/00* (2006.01)
*B01D 29/58* (2006.01)

(52) U.S. Cl.
CPC .............. *B01D29/58* (2013.01); *B01D 24/008* (2013.01); *B67D 7/30* (2013.01); *C02F 1/006* (2013.01); *C02F 2201/003* (2013.01); *C02F 2201/006* (2013.01); *C02F 2301/024* (2013.01); *C02F 2301/04* (2013.01); *C02F 2303/14* (2013.01)

(56) References Cited

U.S. PATENT DOCUMENTS

| | | | |
|---|---|---|---|
| 2,369,915 A | | 2/1945 | Quinn |
| 2,413,375 A | | 12/1946 | Pomeroy |
| 3,246,920 A | * | 4/1966 | Pall ................ 210/322 |
| 3,434,486 A | * | 3/1969 | Kasten ............. 137/67 |
| 3,520,124 A | | 7/1970 | Myers |
| 3,937,399 A | | 2/1976 | Halley |
| 4,028,276 A | | 6/1977 | Harden et al. |
| 4,028,876 A | | 6/1977 | Delatorre |
| 4,109,676 A | * | 8/1978 | Price .............. 137/550 |
| 4,228,012 A | * | 10/1980 | Pall ................ 210/238 |
| 4,265,748 A | * | 5/1981 | Villani et al. .......... 210/132 |
| 4,681,677 A | * | 7/1987 | Kuh et al. ............ 210/88 |
| 4,702,270 A | | 10/1987 | King, Sr. |
| 4,772,386 A | | 9/1988 | Grout et al. |
| 4,818,385 A | | 4/1989 | Medley, III |
| 5,076,912 A | | 12/1991 | Belz et al. |
| 5,236,578 A | | 8/1993 | Oleskow et al. |
| 5,474,675 A | * | 12/1995 | Kupka ............... 210/224 |
| 5,527,451 A | | 6/1996 | Hembree et al. |
| 5,536,394 A | | 7/1996 | Lund et al. |
| 5,536,398 A | * | 7/1996 | Reinke ............ 210/167.22 |
| 5,635,064 A | * | 6/1997 | Bovington ............ 210/338 |
| 5,667,303 A | | 9/1997 | Arens et al. |
| 5,679,243 A | | 10/1997 | Cho |
| 5,846,300 A | | 12/1998 | Johnson |
| 5,882,507 A | | 3/1999 | Tanner |
| 5,997,734 A | | 12/1999 | Koski et al. |
| 6,375,833 B1 | | 4/2002 | Marston et al. |
| 6,416,664 B1 | * | 7/2002 | Bovington .......... 210/238 |
| 6,428,687 B1 | | 8/2002 | Moretto |
| 6,428,708 B1 | | 8/2002 | Halemba et al. |
| 6,454,941 B1 | | 9/2002 | Cutler et al. |
| 6,491,811 B2 | | 12/2002 | Conrad et al. |
| 6,926,828 B2 | | 8/2005 | Shiraishi et al. |
| 7,311,829 B2 | | 12/2007 | Roffman et al. |
| 7,441,665 B2 | | 10/2008 | Bridges et al. |
| 2002/0092813 A1 | | 7/2002 | Radford |
| 2004/0094459 A1 | | 5/2004 | Prater et al. |
| 2004/0238422 A1 | | 12/2004 | Launer et al. |
| 2005/0011824 A1 | | 1/2005 | Vetterli |
| 2005/0035036 A1 | | 2/2005 | Moretto |
| 2005/0072729 A1 | | 4/2005 | Bridges et al. |
| 2005/0109083 A1 | | 5/2005 | Werner |
| 2005/0109683 A1 | | 5/2005 | Joyce et al. |
| 2010/0084347 A1 | | 4/2010 | Wilder et al. |
| 2010/0176044 A1 | | 7/2010 | Domb et al. |
| 2010/0243550 A1 | | 9/2010 | Wilder et al. |

FOREIGN PATENT DOCUMENTS

| | | |
|---|---|---|
| DE | 3828008 A1 | 3/1990 |
| DE | 202008014546 U1 | 4/2009 |
| EP | 0202201 A2 | 11/1986 |
| EP | 0469407 A2 | 2/1992 |
| EP | 1068888 A1 | 1/2001 |
| GB | 2196329 A | 4/1988 |
| JP | 08318113 A | 12/1996 |
| JP | 10337421 A | 12/1998 |
| JP | 2005296919 A | 10/2005 |
| JP | 06072689 A | 3/2006 |
| RU | 2182033 C2 | 5/2002 |
| WO | 9613318 A1 | 5/1996 |
| WO | WO 9941201 A1 | 8/1999 |
| WO | 0200552 A2 | 1/2002 |
| WO | WO 03028848 A1 | 4/2003 |
| WO | 2004052789 A2 | 6/2004 |
| WO | 20040671961 A2 | 8/2004 |
| WO | 2005092798 A1 | 10/2005 |
| WO | 2006003353 A1 | 1/2006 |
| WO | WO 2008026208 A2 | 3/2008 |
| WO | WO 2008044230 A1 | 4/2008 |
| WO | WO 2008129551 A1 | 10/2008 |

* cited by examiner

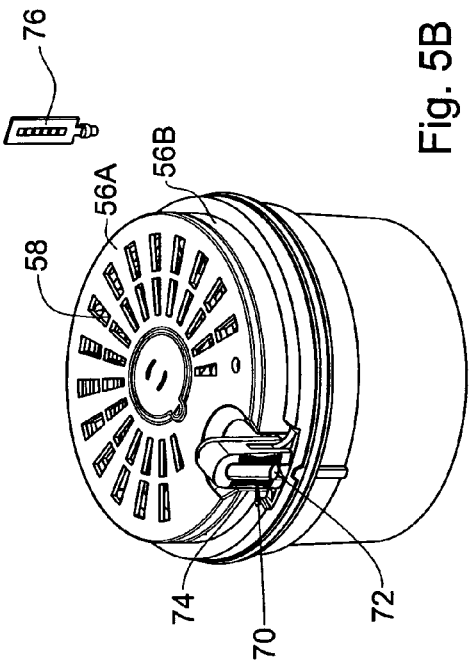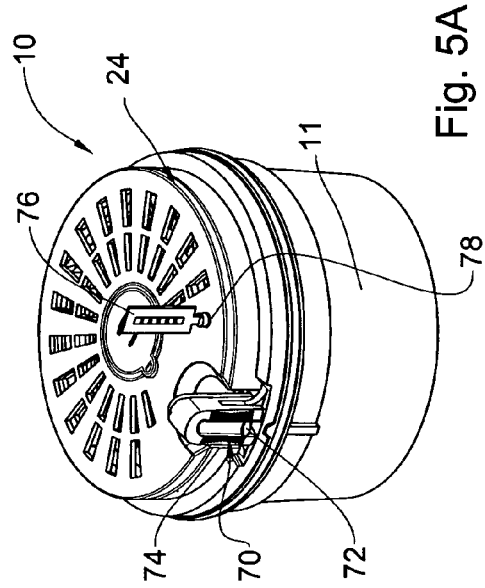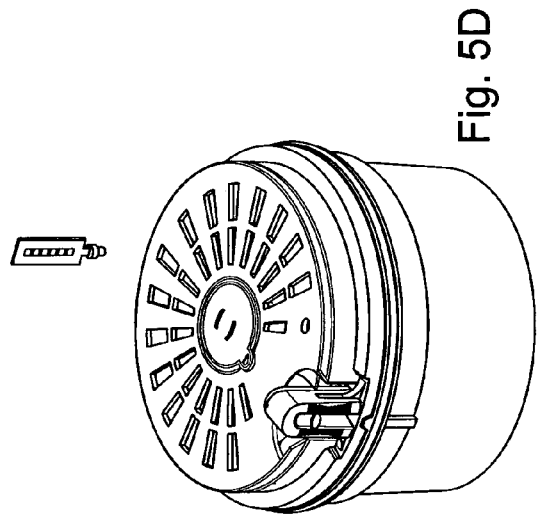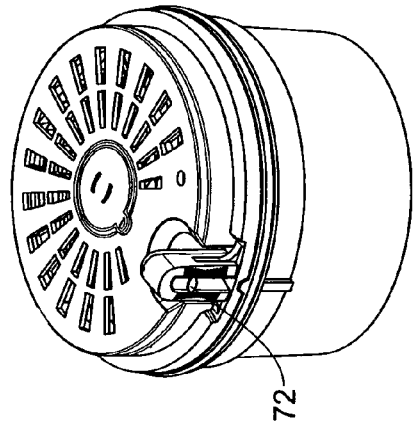

LIQUID FILTER DEVICE

FIELD AND BACKGROUND OF THE INVENTION

Maintaining the desired quality of fluids by passing or circulating the fluid through a filtering medium is important for various applications, for example those dealing with filtration of drinking water. Filtration is generally recognized as an effective means of removing solid particles and/or dissolved matter and/or biological agents routinely present in the water. The choice of which filtration methodology to use from the great variety of available technologies depends on characteristics and/or degree of contamination of water to be filtered and/or manufacturing costs and/or operational costs of the filtration methodology.

Various techniques for filtering liquids, particularly such for filtering water to obtain potable water, have been developed. These techniques typically utilize a filtering medium through which water passes. In some cases, a filtration process involves multiple stages, with each stage designed for a specific type or group of contaminants.

Examples of the filters, filtration techniques and filtering media are described in U.S. Pat. No. 7,311,829; WO 08/044230; WO 08/129551; and WO 08/026208 all assigned to the assignee of the present application.

Filtering media used in fluid filters have limited useful lifetimes after which the filtering media become saturated with filtered out impurities or contaminants and cease to be effective in their removal from the fluid. Means for indicating when a filter reaches the end of its useful life are important for many applications. Filter devices utilizing means for indicating to a user the status of the filter device, thus allowing the user to identify that the filter has become ineffective, have been developed. Such devices are described for example in U.S. Pat. Nos. 4,681,677; 5,997,734 and 6,491,811; as well the above-indicated International publication WO 08/044230.

GENERAL DESCRIPTION

Provided, by an aspect of the disclosure herein, is a liquid filter device configured with an ability to be automatically shut/blocked (without a need for user intervention) when a filtering media has become ineffective. Provided by another aspect of the disclosure herein is a liquid filter device that is configured to enable to maintain a filtering medium in the filter under optimal conditions.

The present invention provides a novel filter device, which according to one aspect of the invention, is configured for maintaining at least a part of the filtering medium therein in a liquid environment. This is important so that the porousivity will not be lost which may occur if the filter medium dries.

Thus, there is provided a filter device for filtering a liquid portion by passing it through at least one filtering medium. The filter device comprises at least one cartridge comprising a treatment region filled with the at least one filtering medium, an inlet for inputting the portion of liquid into the treatment region, and a liquid outlet, the cartridge comprising: a first array of walls arranged in the treatment region in a spaced-apart relationship in a liquid path from the inlet towards the outlet, defining an array of vessel-like spaces in between the walls for the liquid successively flowing through the vessel-like spaces into a tubular vessel at the liquid outlet, dimensions of the tubular vessel being selected to create an effect of communicating vessels within the array of vessel-like spaces to thereby maintain at least a part of the at least one filtering medium in liquid environment.

The arrangement of walls of the first array of walls is such as to define alternating upward and downward flows of the liquid through each two adjacent vessel-like spaces. In some embodiments of the invention, each of the walls of the first array of walls has closed-loop geometry, and the walls and concentrically arranged. The tubular vessel may be located at a center of the concentric arrangement. The liquid may thus flow from the inlet to the outlet in two opposite general flow directions from the periphery towards the center of the cartridge. In some other embodiments, the walls of the first array of walls are configured as spaced-apart plates (planar or not). The liquid may flow from the inlet to the outlet in a general flow direction from one side of cartridge to the other, where the tubular vessel is located.

The filter device may include a pretreatment region accommodated in a liquid path towards the inlet so as to apply an additional treatment to the liquid on its way to the treatment region. For example, the cartridge may include a cover, and the pretreatment region is located in at least a part of the inner region of the cover. The pretreatment may, for example, be release of a substance of nutritional or disinfecting value. An example, of pretreatment is the release of iodine from an iodine containing matrix included in the pretreatment region.

Preferably, the treatment region is divided into a plurality of compartments arranged successively along the liquid path, such that liquid while flowing along the vessel-like space passes through two or more such compartments. The compartments contain different filtering media and are coupled to one another in a manner allowing the liquid passage in between them while substantially preventing mixing of the different filtering media. For example, an interface between the adjacent compartments has an array of perforations or membrane regions of appropriate dimensions. The filtering media suitable to be used in the filter device of the invention include for example a carbonaceous material, chitosan, ion exchanger, metal oxide, metal hydroxide, etc.

According to another aspect of the invention, which may or may not be combined with the above described technique of maintaining at least a part of the filtering medium (media) in the liquid environment, the invention provides a filter device capable of being automatically shut/blocked when the filtering medium has become ineffective. Thus, according to this broad aspect of the invention, there is provided a filter device for filtering liquid by passing it through one or more filtering media, the filter device comprising a cartridge defining a treatment region filled with one or more filtering media; a liquid inlet; a liquid outlet; and a locking mechanism located within a liquid flow through the cartridge and configured to lock at least one of the liquid inlet and the liquid outlet upon expiration of life time of at least one filtering medium.

The locking mechanism includes an erodable member formed by a composition selected to be continuously or gradually erasable during its interaction (direct or not) with the liquid and thereby having a variable volume, and includes a mechanical assembly coupled to the erodable member and shiftable from its unlocking positions into its locking position, the shift being caused by a decrease in the volume of the composition, such that the mechanical mechanism when shifted into its locking position blocks at least one of the liquid inlet and outlet.

The unlocking positions of the mechanical assembly correspond to the volumes of the composition above a certain threshold value, and the locking position of the mechanical assembly corresponds to the volume substantially equal to the threshold value.

In some embodiments, the erodable member is located outside the treatment region.

In some embodiments, the mechanical assembly includes a blocking member displaceable from its retracted positions being disengaged with the outlet into its released position in which it engages with the outlet and thereby blocks the liquid path away from the cartridge.

Such mechanical assembly may comprise a connector which at its one end is attached to the erodable member and at its opposite end is engaged with the blocking member. The volume reduction of the composition drags the connector away from the blocking member until disengaging from the blocking member, thus releasing the blocking member into its released position. The mechanical assembly preferably includes a spring-like member associated with the connector to control its movement during the reduction of volume of the composition.

In some other embodiments, the mechanical assembly is associated with the liquid inlet and may include at least two plates arranged in a parallel relationship one above the other, each having a plurality of perforations or membrane regions for the liquid passage therethrough. The arrangement of plates is shiftable between its normally open position, in which the plates are either spaced from one another or are positioned with alignment between their perforations or membrane regions, thus allowing the liquid flow into the cartridge, and its closed locking position in which the plates are in contact with one another and oriented with a misalignment between their perforations or membrane regions thus blocking the liquid flow into the cartridge.

One of the plates is coupled, by a connector, to the erodable member, and driven for movement(s) with respect to the other plate(s), by the change of the erodable member position due to the change of volume of the composition. Thus, for example the upper plate is hold by the connector in a position, corresponding to the normally open position of the plates, in which the upper plate is spaced from at least one other plate, and during the continuous or gradual volume reduction of the composition the upper plate falls towards a position of contact with at least one other plate and is rotated, resulting in the closed locking position of the plates. The rotational movement may be achieved by using a torsion spring. According to another example, the plates in their normally open position are arranged in contact with one another, and at least one of the plates is rotatable with respect to at least one other plate (by torsion spring), the rotation bringing the plates from the normally open position corresponding to the alignment between their perforations or membrane regions, into the closed locking position in which their perforations or membrane regions are in misalignment.

In some other embodiments of the invention, the locking mechanism comprises a mechanical assembly comprising a blocking member and a coupling member. The blocking member is downwardly biased and the coupling member is upwardly biased by respective springs. The blocking member is blocked from downward displacement, e.g. by bearings associated with a tubular structure stationary included in the cartridge, where the bearings are blocked from lateral movement by a rod of the coupling member. The change of volume of the erodable member causes upward displacement of the coupling member by the spring up to a point where the rod of the coupling member moves out of a space in between the bearings thus allowing the lateral movement of the bearings and accordingly permitting downward movement of the blocking member. Preferably, the blocking member carries at its distal end a flexible diaphragm facilitating a sealing engagement with a nozzle of the outlet.

The filter device may include an indicator responsive to a condition of the locking mechanism and generating output data for presentation to user.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 5A to 5D exemplify the filter device of the present in its successive positions before and during the operation.

DETAILED DESCRIPTION OF EMBODIMENTS

Figure 1:
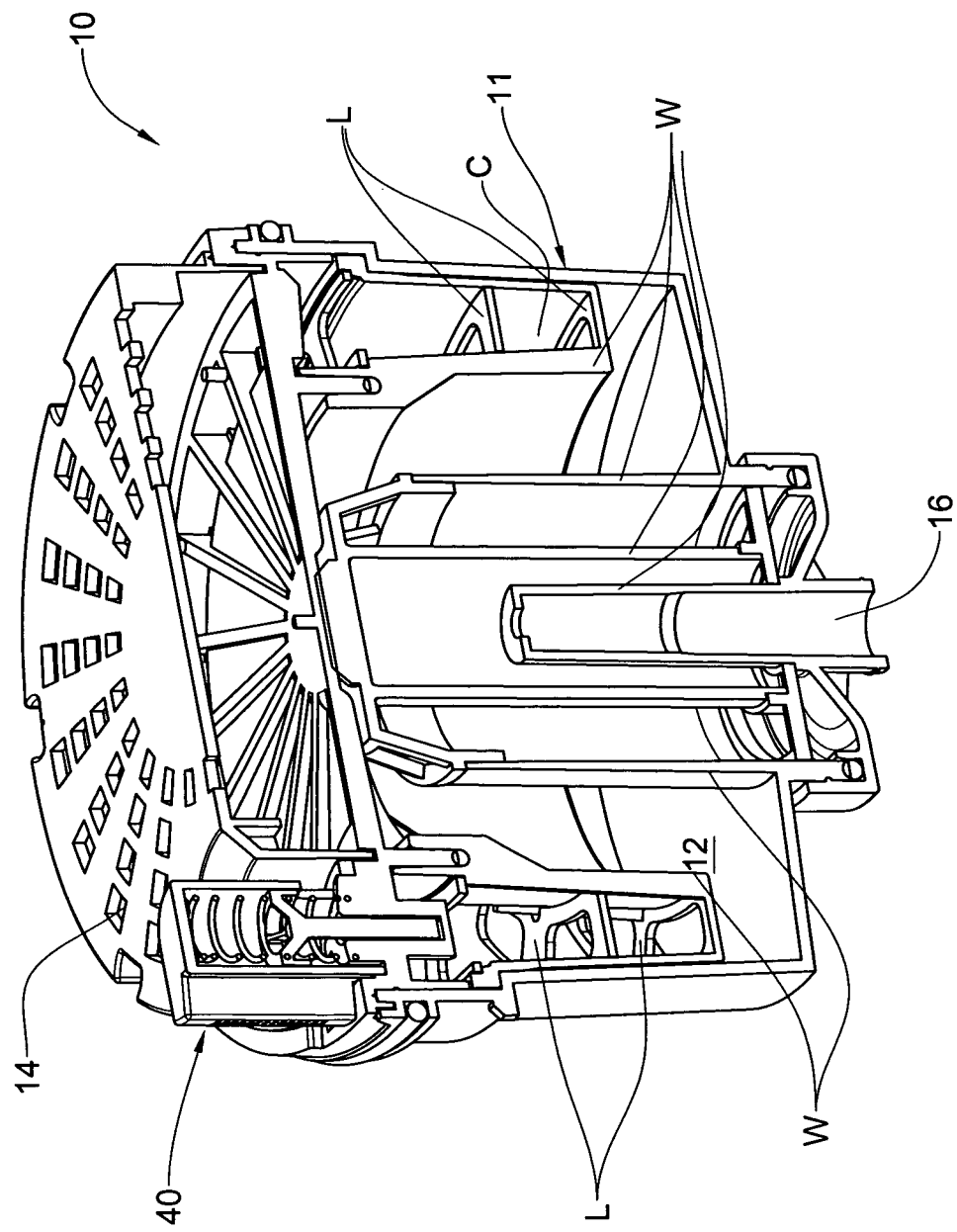
FIG. 1 is a schematic illustration of an example of a filter device of the present invention.

Referring to FIG. 1, there is schematically illustrated a filter device 10 constructed and operated according to aspects of the invention for filtering a liquid (e.g. water) by passing the liquid through one or more filtering media. Filter device 10 may be appropriately designed to be installed into a portable potable water container or a tabletop water filtration device, as well as to be mountable on a water supply valve. Filter device 10 has a cartridge 11 defining a treatment region 12 filled with filtering medium/media, a liquid inlet 14, and a liquid outlet 16.

Preferably provided in the cartridge 11 is a locking mechanism 40, the purpose and configuration of which will be described further below.

As further shown in FIG. 1, cartridge 11 includes a plurality of walls W arranged in treatment region 12 in a spaced-apart substantially parallel relationship in the liquid path from inlet 14 towards outlet 16, and preferably also includes another arrangement of walls, generally at L, extending substantially perpendicular to walls W. Walls W define vertical flow paths with spaces between them. Walls W and L divide the treatment region 12 into compartments, the purpose of which will be described further below. Walls C are formed with liquid flow apertures (perforations or membrane regions) to allow the liquid flow in between compartments.

It should be understood that generally the inlet 14 as well as the outlet 16 may include one or more windows (openings or membrane regions) for liquid passage therethrough in and out of the cartridge 11. For example, the inlet may be circumferentially distributed with respect to the cartridge. The cartridge is configured as gravity fed filter; accordingly, the inlet and outlet are located at the upper and bottom sides of the treatment region respectively. It should also be understood that the filter device may include more than one cartridge arranged in a cascade-like manner thus creating a multi-stage filter device.

Figure 2A:
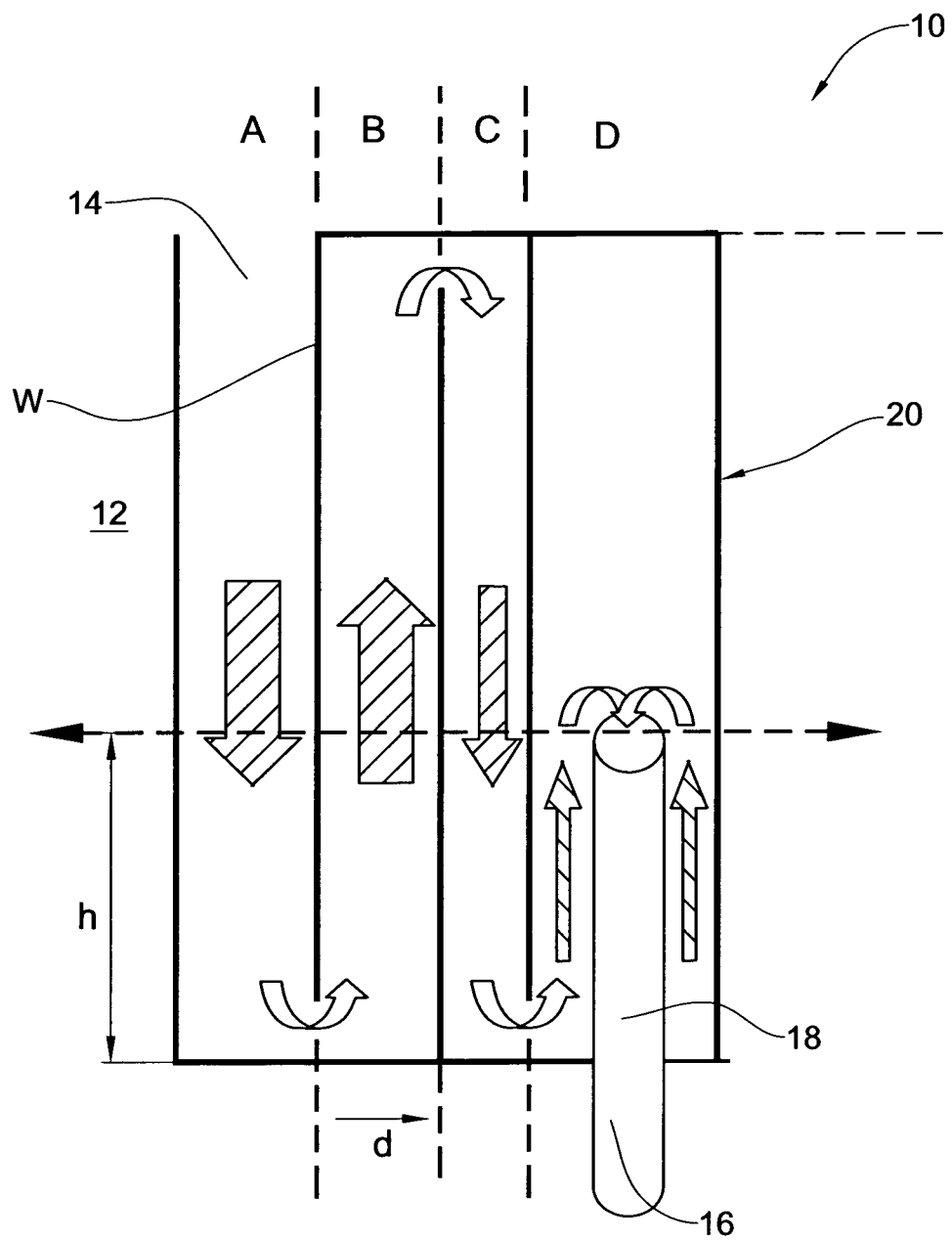
FIGS. 2A and 2B show two examples, respectively, of the arrangement of walls inside a cartridge of the filter device.
Figure 2B:
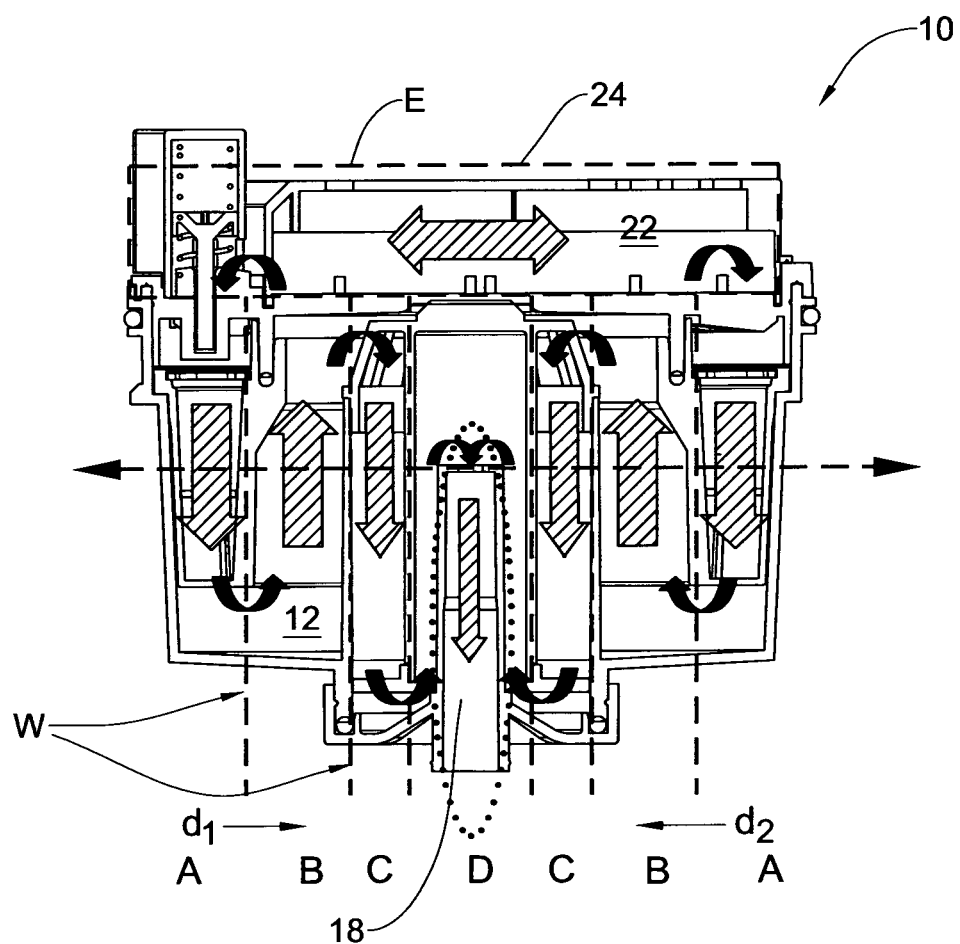

Reference is made to FIGS. 2A and 2B showing two specific, not limiting examples of the configuration of the cartridge of FIG. 1, namely its treatment region 12. To facilitate understanding, the same reference numbers are used for identifying components that are common for all the examples of the invention.

As shown in both examples of FIGS. 2A and 2B, cartridge 11 includes a plurality of walls W arranged in the treatment region in a spaced-apart relationship in the liquid path from the inlet 14 towards the outlet 16. This arrangement defines an array of vessel-like spaces A, B, C, D in between walls W. The liquid successively flows through these vessel-like spaces into a tubular vessel 18 at the liquid outlet. Dimensions of tubular vessel 18 (its height) are selected to create an effect of communicating vessels in the arrangement of vessels A, B, C, D and 18 such that at least a part of the filtering medium/media is always maintained in the liquid environment. More specifically, considering the portion-by-portion feeding of liquid into the filter device, certain amount of filtered liquid will remain in the vessels until a next portion is fed into the treatment region. Also, the diameter of the tubular vessel 18 defines the flow rate of liquid through the filter device. For example, the flow rate of liquid through the filter device may be selected to be about 6 minutes/liter.

Also, as shown in both examples, walls W are arranged such as to define alternating upward and downward flows of the liquid through each two adjacent U-shaped interconnected vessel-like spaces. This results in a turbulent flow of the liquid being filtered thus increasing interaction between the liquid and particles of the filtering medium/media, and improving the quality of the filtered liquid.

As shown in the example of FIG. 2A, the configuration is such that liquid flows through the spaces between plate-like walls W in a general flow direction d from liquid inlet 14 to liquid outlet 16. The latter is made in tubular vessel 18.

In the example of FIG. 2B, each wall W has closed-loop geometry (e.g. circular or polygonal), and walls W and arranged in a concentric manner. Tubular vessel 18 is located in the central vessel D. Liquid flows in opposite, general flow directions $d_1$ and $d_2$ from a periphery (vessels A) to a center (vessel D) of the treatment region 12.

As further shown in the example of FIG. 2B, filter device 10 may define a pretreatment region 22 within a liquid path towards inlet 16 of the treatment region 12. For example, the cartridge may have a cover 24 and pretreatment region 22 is located within an inner region (at least a part thereof) of the cover 24.

Figure 3:
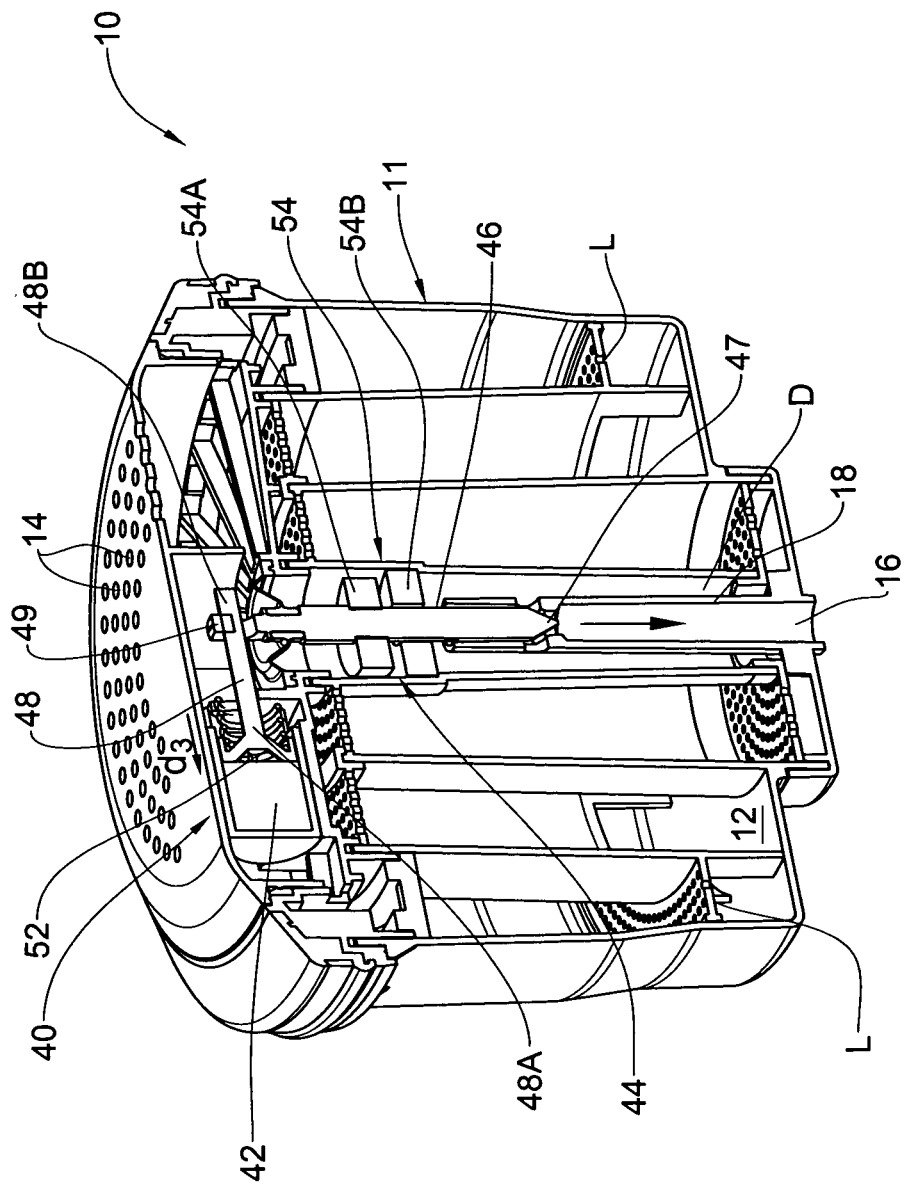
FIG. 3 shows an example of a locking mechanism inside the cartridge.

Reference is made to FIG. 3 showing an example of the configuration of a locking mechanism located within the liquid flow through the cartridge 11. Locking mechanism, generally at 40, is configured to be associated with either the liquid inlet or the liquid outlet or both of them upon expiration of life time of the filtering medium/media. In the present example of FIG. 3, locking mechanism is associated with liquid output 16.

Locking mechanism 40 includes an erodable member 42 formed by a certain composition of a kind being continuously/gradually erasable during its interaction with the liquid. The volume of this composition therefore varies during the operation of the filter device from its maximal value at the beginning of operation, after installing erodable member 42 into the cartridge, until its minimal value as a result of interaction with the liquid. This minimal value presents a threshold value for the amount of the composition corresponding to a condition of the filtering medium/media in the treatment region that does not allow its use for further filtering. It should be understood that the material(s) in said composition and the maximal volume are selected in accordance with the filtering requirements (e.g. filtering medium/media, liquid to be filtered, cartridge volume, etc.). Further provided in the locking mechanism 40 is a mechanical assembly 44 coupled to erodable member 42 such as to be shiftable, by a decrease in the volume of the composition of the erodable member 42, from unlocking positions of the mechanical assembly into a locking position. The configuration is such that mechanical assembly 44 when shifted into the locking position blocks the liquid outlet 16. Thus, unlocking positions of mechanical assembly 44 correspond to value of the volume of composition 42 above the certain threshold value, and the locking position of mechanical assembly 44 corresponds to the volume substantially equal to the threshold value.

It should be noted that erodable materials suitable to be used in erodable member 42 may be of any known type, for example for the filtration of water the erodable composition may include polymeric or non-polymeric materials. Typically, these may include materials that slowly dissolve into the filtering medium without being degraded, materials that degrade into soluble fragments or materials that gradually disintegrate into small insoluble particles or fragments. These materials are either entrapped by the filter before reaching the filtered liquid or are safe for human consumption and do not add unwanted taste or odor. Various example of suitable materials are described for example in WO 08/044230 assigned to the assignee of the present application.

Generally, selection of the erodable composition is defined by the specific liquid to be filtered as well as the filter conditions, such as temperature, pressure, presence of additives, etc. The erodable composition is erodable by the liquid or by an element within the liquid. The extent of exposure of the erodable composition to the liquid correlates with the extent of erosion of said composition.

Erodable member 42 may be of any suitable shape and size. Erodable member 42 may be a substantially solid rigid body, or solid flexible body or a hollow member; may be made of one or multiple materials, e.g. a multi-layer structure. Different materials may have different erosion rates, thus providing a gradual change in the volume of the composition, while the materials erode layer by layer.

Turning back to FIG. 3, mechanical assembly 44 comprises a blocking member 46 aligned with tubular vessel 18 and displaceable with respect to tubular vessel 18 from retracted positions of blocking member 46 into a released position thereof. The configuration is such that blocking member 46, when in either one of the retracted positions, is disengaged from outlet 16 (is located above the outlet as shown in the figure), and when in the released position, engages the outlet 16 (moves downwards along tubular vessel 18).

Displacement of blocking member 46 through retracted positions towards the released position is driven by the change of volume of the erodable/erasable composition. This is implemented by coupling mechanical assembly 44, namely its blocking member 46, to erodable member 42 via a connector 48. As shown, connector 48 is at its one end 48A attached to erodable member 42 and at its opposite end 48B is engaged with blocking member 46. Continuous volume reduction of the composition "drags" connector 48 in a direction $d_3$ away from blocking member 46 until a position of disengagement between connector and blocking member 48, thus releasing blocking member 48 into its released position. In the present specific but not limiting example, engagement between connector 48 and blocking member 46 is achieved by providing a hook-like member 49 and coupling upper end of blocking member 46 thereto (e.g. hook-like member 49 may be integral with blocking member 46). Connector 48 by its end 48B is mounted inside the hook-like member 49 with the ability for sliding therein. Change of volume of composition 42 from its initial maximal value until the minimal one (corresponding to the threshold value) results in a sliding movement of connector 48 in direction $d_3$ until it becomes released from hook-like assembly 49 and thus disengaged from blocking member 46 causing the latter to "fall" into tubular vessel 18 blocking the liquid outlet 16.

Preferably, mechanical assembly 44 includes a spring member 52 interconnected between connector 48 and erodable member 42. Movement of connector 48 in direction $d_3$ (during the reduction of volume of the composition) is thus controlled by tension of spring 52.

As further shown in FIG. 3, in the present example, blockage of the liquid outlet is achieved by engagement between blocking member 46 and tubular vessel 18. More specifically, blocking member 46 at its distal end, by which it is insertable into tubular vessel 18. Also, mechanical assembly 44 includes a restriction mechanism 54 which limits the movement of blocking member 46 with respect to tubular vessel 18. Restriction mechanism 54 is formed by two support elements 54A and 54B supporting blocking member 46 at two spaced-apart locations. In the present example, these are ring-like elements 54A and 54B mounted on the blocking member 54A such that elements 54A is attached to blocking member 46 and element 54B is attached to the cartridge (to the walls of vessel-like space D in which tubular vessel 46 is located or to the tubular vessel). Thus, sliding movement of blocking member 46 in a direction towards the tubular vessel 18 is limited by a distance between ring-like elements 54A and 54B.

Figure 4A:
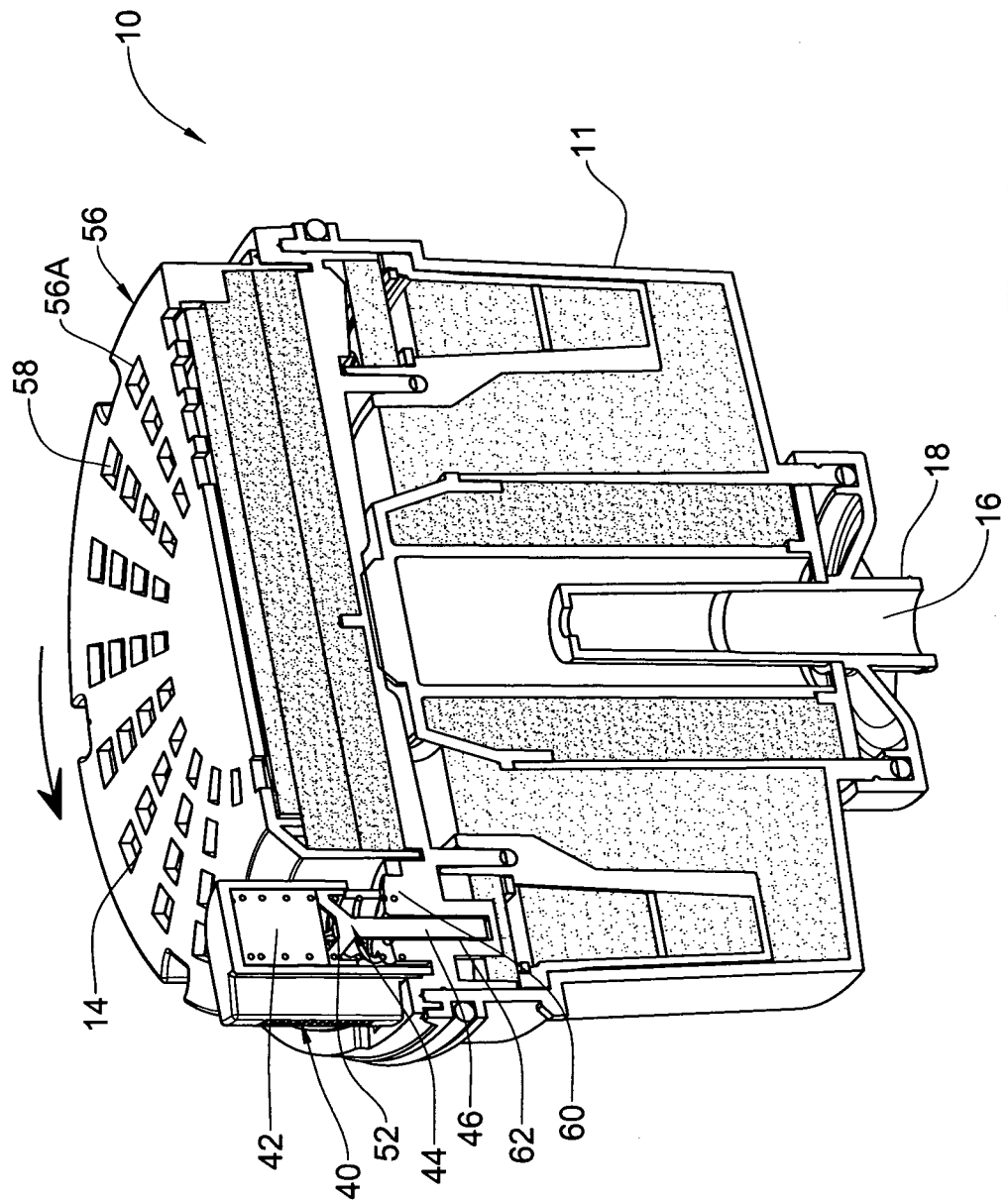
FIGS. 4A and 4B show another example of the configuration of a locking mechanism inside the cartridge.
Figure 4B:
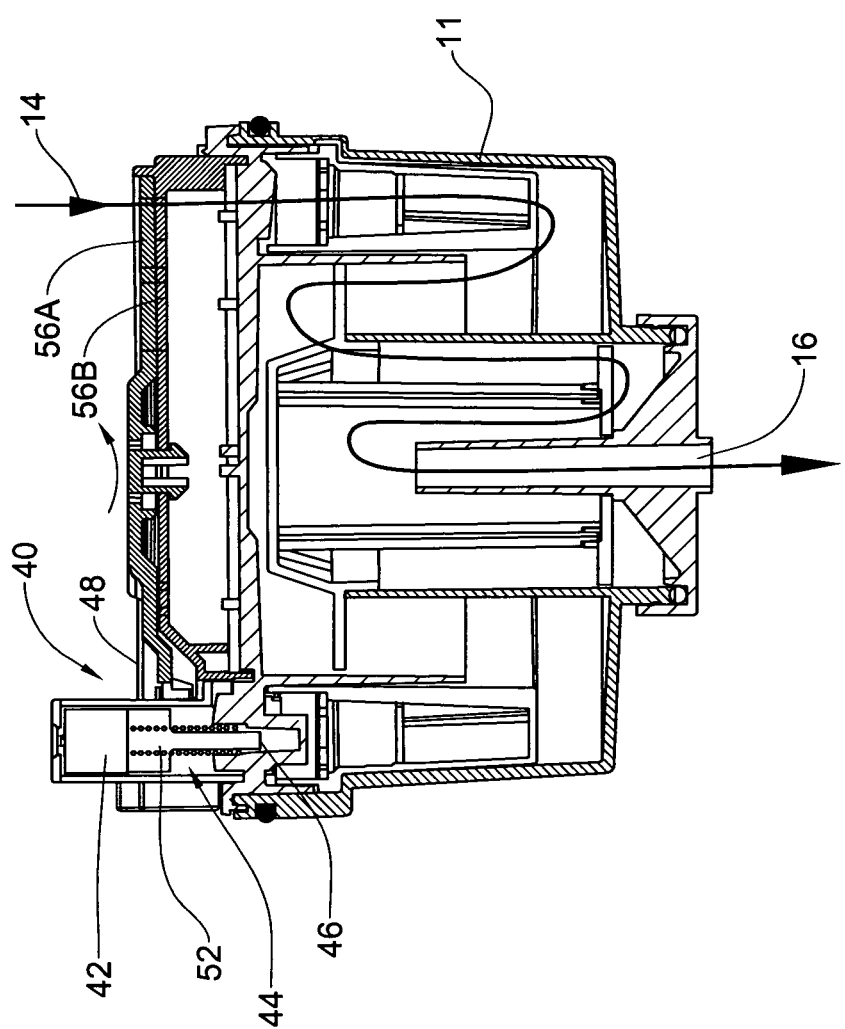

Elements 54A and 54B may be magnetic elements attractable to one another by magnetic forces. In the initial retracted position of the blocking member 46 (corresponding to the maximal volume of the erasable composition), elements Reference is now made to FIGS. 4A and 4B illustrating another example of the configuration of locking mechanism 40. In this example, locking mechanism is associated with liquid inlet 14. Similar to the above described example, locking mechanism 40 includes an erodable member 42 and a mechanical assembly 44 coupled to erodable member 42 and driven by said member 42 (i.e. change in the volume of composition) from normally open positions of the liquid inlet into a closed, blocked position thereof. Mechanical assembly 44 includes an arrangement 56 of plates (at least two plates 56A and 56B arranged in a parallel relationship one above the other). These plates 56A and 56B may be associated with a cover (24 in FIG. 2B) of the cartridge. Each plate has a plurality of perforations or membrane regions, generally at 58, for the liquid passage therethrough. When these perforations in the two plats are at least partially aligned water flow is enabled; and when there is no alignment water flow is blocked. One of the plates 56 is coupled to erodable member 42 the erosion-mediated movement of which causes a relative displacement of the plates, one with respect to the other, from their positions corresponding to the normally open positions of the locking mechanism to that of the closed locking position.

Generally, the normally open positions of the locking mechanism may correspond to the arrangements of plates when they are spaced from one another thus allowing the liquid flow into the cartridge. Alternatively (or additionally), the normally open positions may correspond to the plates being in contact with one another and oriented one with respect to the other with an alignment between their perforations or membrane regions, thus allowing the liquid flow into the cartridge. The closed locking position corresponds to the position of plates when they are in contact with one another and oriented with a misalignment between their perforations or membrane regions, thus blocking the liquid flow into the cartridge.

In the example of FIGS. 4A and 4B, plates 56A and 56B are also in contact with one another, and one of the plates, e.g. upper plate 56A, can be rotated with respect to the other plate 56B. Plates 56A and 56B are kept in the position of alignment between their perforations/membranes 58 and driven (via rotation of plate 56A) into the position of misalignment by erodable member 42. More specifically, erodable member 42 is coupled to a blocking member 46 and is coupled, via a connector 48 (seen in FIG. 4B), to plate 56A. Connector 48 may be associated with a torsion spring (not shown). Blocking member 46 is connectable to the other plate 56B. This is implemented by installing blocking member 46 in a slot 62 formed in a support 60 rigidly connected to plate 56B (not specifically shown in the figure) with ability for sliding movement of blocking member 46 along the slot. A spring 52 is provided to control upward movement of blocking member 46. In the open positions of the locking mechanism, blocking member 46 is engaged with support 60 (is located inside slot 62) thus keeping connection between plates 56A and 56B (via support 60 and connector 48). Change in the volume of erasable composition results in a change in the vertical position of blocking member 46 pushing it upwards until it disengages from slot 62. This results in a disconnection between support 60 (plate 56B) and connector 48 (plate 56A), thus causing rotation of plate 56A with respect to plate 56B towards the position of misalignment between the perforations/membranes, blocking the liquid inlet into the treatment region.

The filter device of the invention thus provides for automatic prevention of further use of the device, i.e. automatically blocking the liquid inlet and/or liquid outlet upon expiration of the lifetime of the filtering medium. This technique does not require the user intervention, i.e. does not require any user input in order to block the filter device. The filter device, however, may include an indicator to advise the user about inoperative state of the filter device.

Reference is made to FIGS. 5A to 5D exemplifying fours sequential positions of the filter device, namely of its locking mechanism and indicator. In this example, the locking mechanism is configured similar to the example described above with reference to FIGS. 4A-4B. Filter device 10 has a cartridge formed with a cover 24, incorporating a locking mechanism (not specifically shown), and is equipped with an indicator unit 70. The latter is mounted on cover 24 and is in communication with either one of erodable member (42 in FIGS. 4A-4B) or locking mechanism 40 or both of them, and is configured to be responsive to a change in the volume of erasable composition and/or in the positions of the locking mechanism to provide an indication as to the filter status, and particularly when a filter reaches the end of its useful life. For example, indicator 70 has a ruler or scale 74 and a slider 72 mounted for movement along the ruler; slider 74 is in communication with the blocking member and is calibrated such that movement of the blocking member is correlated with the movement of slider 72.

As further shown in the figures, filter device 10 may also include an external locking mechanism 76 removably mounted on the cartridge so as to be keep it in its locking position preventing the undesired exposure of the erodable member inside the cartridge to liquid environment. FIG. 5A shows the filter device before being put in operation: locking mechanism 76 is in operative position being attached to a corresponding opening 78 made in the cover 24 to screen the erodable member from the surroundings of the filter device. In order to put the filter device into operation, locking mechanism 76 is removed from the cover (FIG. 5B). In this initial operating position of the filter device, plates 56A and 56B are oriented with vertical alignment between their perforations/ membranes 58, and slider 72 of indicator 70 is in its lower position corresponding to the maximal volume of the erasable composition. During the device operation, the erodable member interacts with liquid being filtered resulting in reduction in the volume of erasable composition and a corresponding upward movement of slider 72 (FIG. 5C), until its uppermost position corresponding to the minimal, threshold value of the volume of the erasable composition and thus the closed, blocked position of the liquid inlet, i.e. inoperative position of the filter device (FIG. 5D).

As indicated above, the cartridge is preferable configured to enable filtering of the liquid with various (generally at least two) different filtering media. This can be implemented by dividing the treatment region into an array of compartments. This is better seen in FIGS. 4A and 4B. As also mentioned above, adjacent compartments C are in liquid communication with one another in a manner substantially preventing mixing between the different filtering media in said compartments respectively. This can be achieved by providing perforations/membranes in wall L between compartments C of a dimension allowing the liquid passage therethrough and preventing the passage of particles of the respective filtering medium.

Figure 6A:
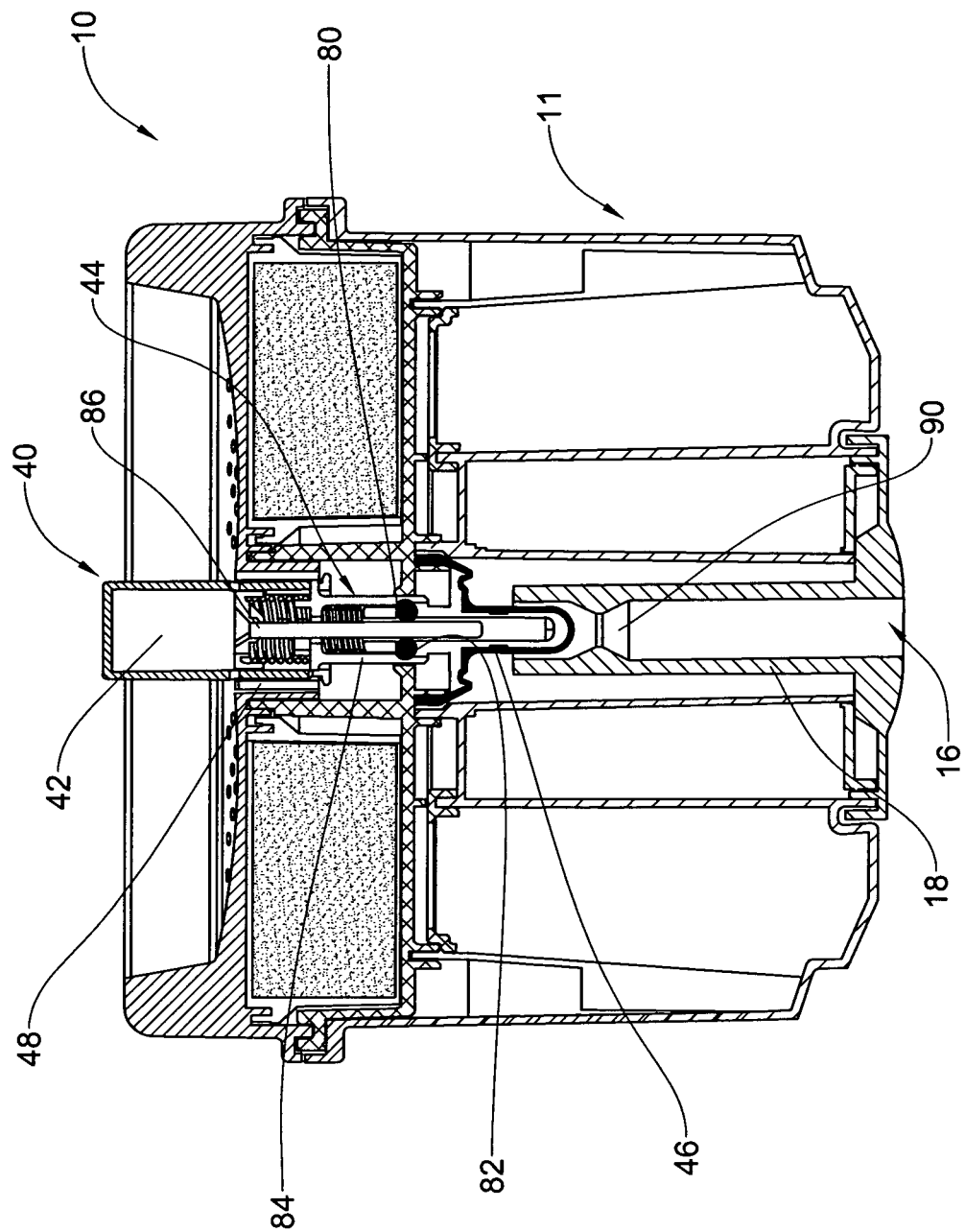
FIGS. 6A and 6B show another example of a locking mechanism inside the cartridge.
Figure 6B:
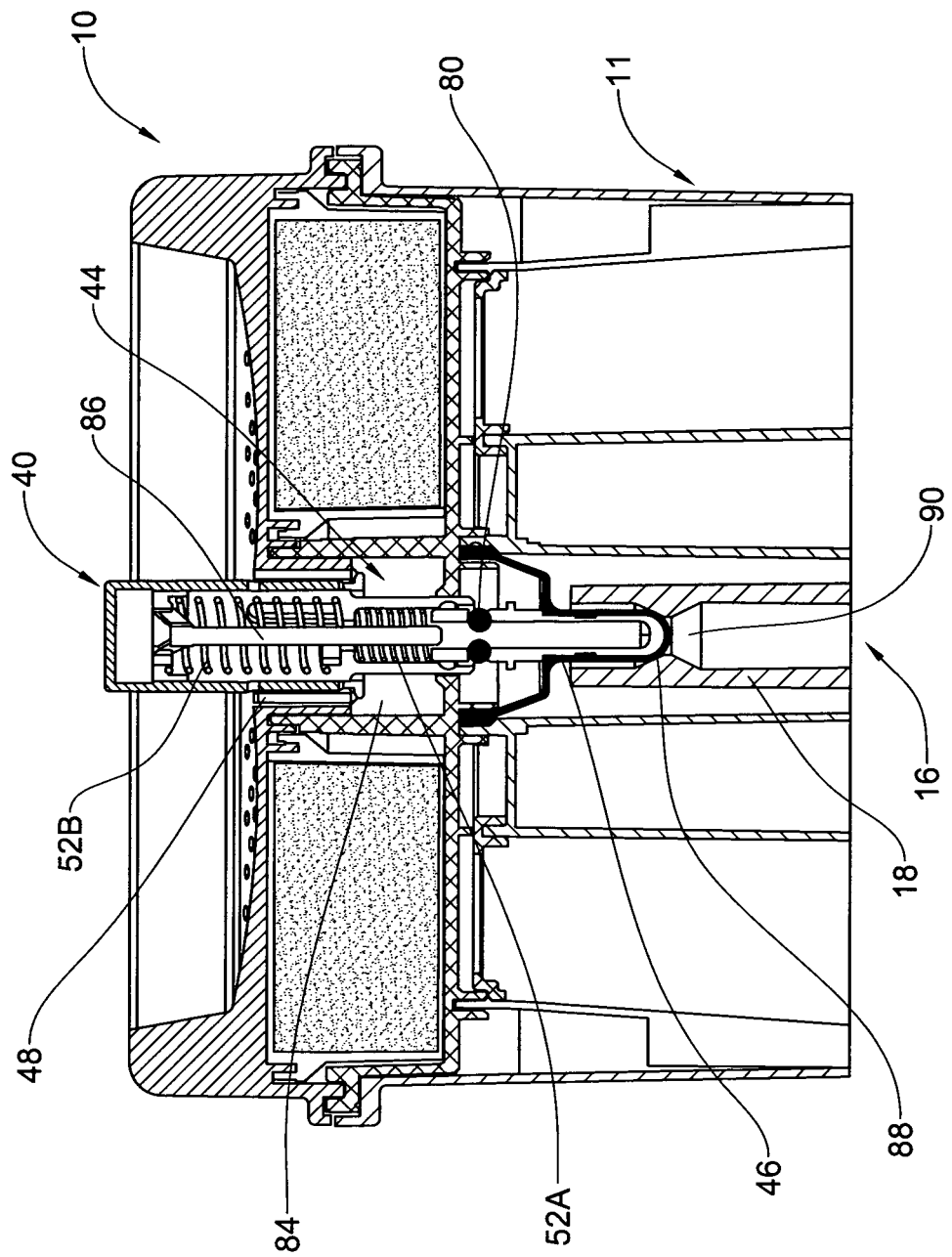

Referring now to FIGS. 6A and 6B shown is another embodiment of a filter device 10. Elements with the same functions to those described above are indicated by the same reference numeral and the reader is referred to the above description for an explanation of the function. In this embodiment the locking mechanism 40 is associated with the tubular member 18 of liquid outlet 16.

Locking mechanism 40 of this embodiment includes a mechanical assembly 44 with a blocking member 46 and a coupling member 48, the former being downwardly biased and the latter upwardly biased by respective springs 52A and 52B. Member 46 is blocked from downward displacement by bearings 80 which are held in annular recess 82 formed on the inner face of tubular structure 84 which is stationary included in the cartridge 11, e.g. integral with its cover 24. Bearings 80 are blocked from lateral movement by rod 86 of coupling member 48.

With the erosion of the erodable member (i.e. change of volume), the coupling member 48 becomes upwardly displaced by the spring 52B up to the point where rod 86 moves out of the space in between bearings 80 and consequently bearing 80 can move laterally thus permitting downward movement of blocking member 46 as shown in FIG. 6B. Blocking member 46 carries at its distal end a flexible (e.g. made of rubber) diaphragm 88 that in the state shown in FIG. 6B provides a sealing engagement with outlet nozzle 90.

The invention claimed is:

1. A filter device for filtering liquid by passing it through one or more filtering media, the filter device comprising a cartridge defining a treatment region filled with said one or more filtering media; a liquid inlet; a liquid outlet; and a locking mechanism located within the cartridge and configured to lock at least one of the liquid inlet and the liquid outlet of the cartridge upon expiration of life time of said at least one filtering medium, wherein said locking mechanism comprises a mechanical assembly comprising a blocking member, a connector and an erodible member; said erodable member being formed of a composition selected to be erodible in response to exposure to the liquid and thereby reduce its volume; the blocking member having an unlocking and a locking position and shiftable between the two positions, said blocking member being biased to the locking position and held in the unlocking position by the connector; the connector being coupled at its one end to said erodible member and at its opposite end is engaged with the blocking member, such that a volume reduction of said erodible member drags said connector away from said blocking member until disengaging from the blocking member thus releasing the blocking member into the locking position.

2. A filter device according to claim 1 wherein the said unlocking position corresponds to the volume of the composition above a threshold value, and said locking position corresponds to a volume substantially equal to said threshold value.

3. A filter device according to claim 1, wherein said blocking member is displaceable from its unlocking position in which it is disengaged from the outlet into its locking position in which it engages the outlet and thereby blocks the liquid path through the cartridge.

4. A filter device according claim 1, wherein said mechanical assembly comprises a spring member associated with said connector so as to bias it to displace during the reduction of volume of the erodible member.

5. A filter device according to claim 1, wherein the blocking member is downwardly biased and the connector is upwardly biased by respective springs.

6. A filter device according to claim 5, wherein the blocking member is blocked from downward displacement by bearings associated with a tubular structure, said bearings being blocked from lateral movement by a rod of the connector.

7. A filter device according to claim 6, wherein the change of volume of the erodible member causes upward displacement of the connector by the spring up to a point where the rod of the connector moves out of a space in between the bearings allowing the lateral movement of the bearings thus permitting downwardly movement of the blocking member.

8. A filter device according to claim 7, wherein the blocking member carries at its distal end a flexible diaphragm allowing a sealing engagement with a nozzle of said outlet.

9. A filter device for filtering a liquid portion by passing it through at least one filtering medium, the filter device comprising at least one cartridge comprising a treatment region filled with the at least one filtering medium, an inlet for liquid ingress into said treatment region, and a liquid outlet, the cartridge being configured for gravitational filtering and comprising:

a first array of walls arranged in said treatment region in a spaced-apart substantially parallel relationship in a liquid flow path from the inlet towards the outlet, the first array of walls defining an array of vessel-like spaces in between said walls, allowing for alternating upward and downward flow of the liquid between each two vessel-like spaces arranged successively along the flow path of the liquid from the inlet into a tubular vessel at the liquid outlet, the dimensions of said tubular vessel being selected to create an effect of communicating vessels within said array of vessel-like spaces, to thereby maintain at least a part of said at least one filtering medium in liquid environment, wherein said first array of walls comprises walls having closed-loop geometry and being concentrically arranged.

10. A filter device according to claim 9, wherein said tubular vessel is located at a center of the concentric arrangement.

11. A filter device for filtering a liquid portion by passing it through at least one filtering medium, the filter device comprising at least one cartridge comprising a treatment region filled with the at least one filtering medium, an inlet for liquid ingress into said treatment region, and a liquid outlet, the cartridge being configured for gravitational filtering and comprising:

a first array of walls arranged in said treatment region in a spaced-apart substantially parallel relationship in a liquid flow path from the inlet towards the outlet, the first array of walls defining an array of vessel-like spaces in between said walls, allowing for alternating upward and downward flow of the liquid between each two vessel-like spaces arranged successively along the flow path of the liquid from the inlet into a tubular vessel at the liquid outlet, the dimensions of said tubular vessel being selected to create an effect of communicating vessels within said array of vessel-like spaces, to thereby maintain at least a part of said at least one filtering medium in liquid environment, and comprising a locking mechanism located within the liquid flow path through the cartridge and configured to block at least one of the liquid inlet and the liquid outlet upon expiration of life time of said at least one filtering medium.

12. A filter device according to claim 11, wherein said locking mechanism comprises:

an erodible member formed by a composition selected to be erodible in response to interaction with the liquid to thereby reduce its volume; and a mechanical assembly coupled to said erodible member and shiftable from its unlocking positions into its locking position, a shift being driven by a reduction in the volume of said erodible member, such that said mechanical assembly when shifted into its locking position blocks at least one of the liquid inlet and outlet.

13. A filter device according to claim 12, wherein said unlocking positions of the mechanical assembly correspond to the volumes of said erodible member above a certain threshold value, and the locking position of said mechanical assembly corresponds to the volume substantially equal to said threshold value.

14. A filter device according to claim 12, wherein said mechanical assembly comprises a blocking member displaceable along said tubular vessel from its unlocking position being disengaged with said outlet into its locking position in which it engages with said outlet and thereby blocks the liquid path away from the cartridge.

15. A filter device according to claim 14, wherein said mechanical assembly comprises a connector which at its one end is attached to said erodible member and at its opposite end is engaged with said blocking member, such that said volume reduction of said erodible member drags said connector away from said blocking member until disengaging from the blocking member thus releasing the blocking member into its unlocking position.

16. A filter device according to claim 15, wherein said mechanical assembly comprises a spring member associated with said connector to control its movement during the reduction of volume of the erodible member.

17. A filter device according to claim 14, wherein the blocking member is downwardly biased and the connector is upwardly biased by respective springs.

18. A filter device according to claim 17, wherein the blocking member is blocked from downwardly displacement by bearings associated with a tubular structure stationary included in the cartridge, said bearing being blocked from lateral movement by a rod of the connector.

19. A filter device according to claim 18, wherein the change of volume of the erodible member causes upward displacement of the connector by the spring up to a point where the rod of the connector moves out of a space in between the bearings allowing the lateral movement of the bearings thus permitting downwardly movement of the blocking member.

20. A filter device according to claim 19, wherein the blocking member carries at its distal end a flexible diaphragm allowing a sealing engagement with a nozzle of said outlet.

21. A filter device according to claim 20, comprising an indicator responsive to a condition of the locking mechanism and generating output data for presentations to a user.

* * * * *